US00RE37514B1

(19) United States
(12) Reissued Patent
Sasage et al.

(10) Patent Number: US RE37,514 E
(45) Date of Reissued Patent: Jan. 15, 2002

(54) DARK GRAY COLORED GLASS

(75) Inventors: Mizuki Sasage; Takashi Kijima, both of Yokohama (JP)

(73) Assignee: Asahi Glass Company Ltd., Tokyo (JP)

(21) Appl. No.: 09/592,846

(22) Filed: Jun. 13, 2000

Related U.S. Patent Documents

Reissue of:
(64) Patent No.: 5,905,047
Issued: May 18, 1999
Appl. No.: 08/821,299
Filed: Mar. 20, 1997

(30) Foreign Application Priority Data

Mar. 29, 1996 (JP) ..... 8-077071
Oct. 29, 1996 (JP) ..... 8-287095

(51) Int. Cl.[7] ..... C03C 3/087
(52) U.S. Cl. ..... 501/71; 501/904; 501/905
(58) Field of Search ..... 501/71, 904, 905

(56) References Cited

U.S. PATENT DOCUMENTS 4,104,076 A * 8/1978 Pons ..... 501/71
4,873,206 A * 10/1989 Jones ..... 501/71
5,023,210 A 6/1991 Krumwiede et al.
5,264,400 A * 11/1993 Nakaguchi et al. ..... 501/71
5,352,640 A * 10/1994 Combes et al. ..... 501/71
5,393,593 A * 2/1995 Gulotta et al. ..... 501/71
5,411,922 A 5/1995 Jones
5,545,596 A * 8/1996 Alrarez Casariego et al. 501/71
5,582,455 A * 12/1996 Casariego et al. ..... 501/71
5,728,471 A * 3/1998 Dupont et al. ..... 501/71
5,877,102 A * 3/1999 DuPont et al. ..... 51/71
5,932,502 A * 8/1999 Longobardo et al. ..... 501/71

FOREIGN PATENT DOCUMENTS

EP 0536049 * 4/1993
GB 2289273 * 11/1995
JP 62-47740 9/1994
JP 8-59287 * 3/1996

OTHER PUBLICATIONS

Database WPI, derwent Publications, AN 94–321988, JP–06–247740, Sep. 1994.*

* cited by examiner

*Primary Examiner*—Michael Marcheschi
(74) *Attorney, Agent, or Firm*—Oblon, Spivak, McClelland, Maier & Neustadt, P.C.

(57) ABSTRACT

A dark gray colored glass comprising 100 parts by weight of a soda lime silicate glass as a matrix component and coloring components consisting essentially of from 0.8 to 1.5 parts by weight of total iron calculated as $Fe_2O_3$, from 0.1 to 0.3 part by weight of FeO, from 0 to 1.0 part by weight of $TiO_2$, from 0.0005 to 0.015 part by weight of Se, from 0.02 to 0.05 part be weight of CoO and from 0.002 to 0.05 part by weight of $Cr_2O_3$.

9 Claims, No Drawings

DARK GRAY COLORED GLASS

Matter enclosed in heavy brackets [ ] appears in the original patent but forms no part of this reissue specification; matter printed in italics indicates the additions made by reissue.

The present invention relates to a dark gray colored glass having low visible light transmittance, low ultraviolet ray transmittance, low solar radiation transmittance and low excitation purity, which is suitable for a sun roof or rear window glass of an automobile.

A typical neutral gray colored heat absorbing glass containing $Fe_2O_3$, Se, CoO, NiO, $Cr_2O_3$, etc., is known.

However, nickel is not desirable, since it sometimes forms nickel sulfide in glass. Nickel sulfide is almost indistinguishable by naked eyes and presents no adverse effects to glass in a usual state. However, it has a large thermal expansion coefficient and thus sometimes causes a thermal stress sufficient to break the glass e.g. when the glass is subjected to quenching for toughening.

The following glasses may be mentioned as gray colored glasses which contain no nickel and which have sufficiently low visible light transmittance to be useful for sun roof or rear window glasses of automobiles.

U.S. Pat. No. 4,873,206 discloses a glass which contains total iron in an amount of from 0.6 to 1.0 wt %, as calculated as $Fe_2O_3$, and Se and CoO, and which does not contain nickel or chromium. However, this glass has high solar radiation transmittance and is not necessarily suitable for sun roof of an automobile.

JP-A-4-275943 (which corresponds to U.S. Pat. No. 5,393,593) discloses glasses which contain total iron in an amount of from 1.0 to 1.7 wt %, as calculated as $Fe_2O_3$, and Se and CoO, and which do not contain nickel or chromium. However, most of glasses specifically disclosed in this publication contains FeO in an amount exceeding 0.30 wt %. Accordingly, they are poor in the thermal efficiency during melting and likely to freeze at the bottom of the melting furnace which is remote from the heating source. In Example 4 of this publication, the content of FeO is 0.264 wt %, but the glass is strongly bluish probably due to a poor color forming efficiency of Se. In Examples 1 and 3 thereof, the content of FeO is not too high, and the bluish or reddish color may be within a not distinctive range, as judged from the dominant wavelength, but the amount of total iron is so large that the excitation purity is high. No dark gray colored glass having a low excitation purity has been obtained within a range where the content of FeO is not higher than 0.30 wt %.

U.S. Pat. No. 5,352,640 discloses a glass which contains total iron in an amount of from 1.4 to 4 wt %, as calculated as $Fe_2O_3$, and optionally CoO, Se and $Cr_2O_3$. However, this glass may sometimes be difficult to melt since the amount of total iron is large. Further, no Examples are disclosed for a combination of Se and $Cr_2O_3$, and glasses specifically disclosed in Examples all have a high excitation purity.

Further U.S. Pat. No. 5,411,922 discloses a glass composition which does not contain nickel or chromium. However, no specific Examples for the composition are disclosed.

It is an object of the present invention to solve the above problems of the prior art and to provide a glass which is readily meltable and can be produced by a conventional float glass production process and which exhibits a dark gray color with the visible light transmittance controlled to be as low as possible, and with the solar radiation transmittance and ultraviolet ray transmittance lowered substantially, whereby the excitation purity is low, and a neutral color can readily be obtained.

The present invention provides a dark gray colored glass comprising 100 parts by weight of a soda lime silicate glass as a matrix component and coloring components essentially consisting of from 0.8 to 1.5 parts by weight of total iron calculated as $Fe_2O_3$, from 0.1 to 0.3 part by weight of FeO, from 0 to 1.0 part by weight of $TiO_2$, from 0.0005 to 0.015 part by weight of Se, from 0.02 to 0.05 part by weight of CoO and from 0.002 to 0.05 part by weight of $Cr_2O_3$.

Now, the reasons for defining the above coloring components will be described.

If the content of the total iron calculated as $Fe_2O_3$ is less than 0.8 part by weight, per 100 parts by weight of the matrix component, the visible light transmittance tends to be too high. The content is preferably at least 1.0 part by weight. On the other hand, if it exceeds 1.5 parts by weight, per 100 parts by weight of the matrix component, it tends to be difficult to obtain a low excitation purity. The content is preferably at most 1.4 parts by weight, more preferably at most 1.35 parts by weight, per 100 parts by weight of the matrix component.

Among the total iron, the content of ferrous (bivalent) iron calculated as $Fe_2O_3$ is preferably from 10 to 30%, more preferably from 15 to 25%, based on the total iron calculated as $Fe_2O_3$. If the content of ferrous iron is less than 10%, the solar radiation transmittance tends to be high. If it exceeds 30%, $SO_3$ used as a refining agent tends to be reduced, whereby the refining effects will decrease, or due to formation of ferric sulfide, an amber color is likely to form. Further, evaporation of Se tends to be vigorous during melting, whereby it tends to be difficult to incorporate an adequate amount of Se.

If the content of FeO exceeds 0.3 part by weight, per 100 parts by weight of the matrix component, the thermal efficiency during melting tends to be poor, and the glass melt is likely to freeze at the bottom of the furnace which is remote from the heating source. The content is preferably at most 0.26 part by weight, per 100 parts by weight of the matrix component. On the other hand, if the content is less than 0.1 part by weight, per 100 parts by weight of the matrix component, it tends to be difficult to attain sufficiently low solar radiation transmittance. The content is preferably at least 0.22 part by weight, per 100 parts by weight of the matrix component.

$TiO_2$ is not essential, but may be incorporated to adjust the visible light transmittance.

$TiO_2$ is usually regarded as a component to be incorporated to reduce the ultraviolet ray transmittance $T_{uv}$. However, as a result of a detailed study on the effect of its incorporation within the range of the glass composition of the present invention, the present inventors have found that when $TiO_2$ is incorporated in a small amount, the visible light transmittance $T_{va}$ can be adjusted without presenting no substantial influence to $T_{uv}$. Its effect is such that when $TiO_2$ is incorporated in an amount of 0.06 part by weight, per 100 parts by weight of the matrix component, $T_{va}$ is reduced by 0.3% in a thickness of 5 mm. With the glass of the present invention, the absolute value of $T_{va}$ is small, and incorporation of $TiO_2$ is accordingly very effective for fine adjustment of $T_{va}$.

Specifically, incorporation of $TiO_2$ in an amount of at least 0.05 part by weight, per 100 parts by weight of the matrix component, is effective to adjust the visible light transmittance. On the other hand, from the view-point of economical efficiency, $TiO_2$ may be incorporated in an amount of up to 1.0 part by weight, per 100 parts by weight of the matrix component. However, this effect saturates at a relatively small amount, and it is preferred to control the content of $TiO_2$ to a level of at most 0.095 part by weight, per 100 parts by weight of the matrix component.

If the content of Se is less than 0.0005 part by weight, per 100 parts by weight of the matrix component, the color of the glass tends to be bluish. The content is preferably at least 0.001 part by weight. On the other hand, if the content exceeds 0.015 part by weight, per 100 parts by weight of the matrix component, the excitation purity tends to be high, and the glass tends to be yellowish, whereby it tends to be difficult to obtain a gray colored glass. The content is preferably at most 0.005 part by weight, per 100 parts by weight of the matrix component.

If the content of CoO is less than 0.02 part by weight, per 100 parts by weight of the matrix component, the visible light transmittance tends to be too high. The content is preferably at least 0.021 part by weight. On the other hand, if the content exceeds 0.05 part by weight, per 100 parts by weight of the matrix component, the color of the glass tends to be bluish, whereby it tends to be difficult to obtain a gray colored glass. The content is preferably at most 0.03 part by weight, per 100 parts by weight of the matrix component.

With respect to NiO, it is preferred not to contain it to prevent formation of nickel sulfide.

Further, for fine adjustment of the color or the like, MnO may be incorporated in an amount of at most 0.1 part by weight, per 100 parts by weight of the matrix component, or $Nd_2O_3$ may be incorporated in an amount of at most 0.01 part by weight, per 100 parts by weight of the matrix component, so long as the basic properties of the glass of the present invention will not be impaired.

As a component for absorbing ultraviolet rays, $CeO_2$ may be incorporated in an amount of at most 0.5 part by weight, per 100 parts by weight of the matrix component, or $V_2O_5$ may be incorporated in an amount of at most 0.5 part by weight, per 100 parts by weight of the matrix component, so long as the basic properties of the glass of the present invention will not be impaired.

It is known to incorporate a large amount of an iron content in order to reduce the visible light transmittance. However, if a large amount of an iron content is incorporated within the range of the composition of the present invention, the excitation purity increases substantially although the visible light transmittance can be reduced, as shown in the subsequent Examples. In general, if the visible light transmittance is low, the excitation purity is not problematic in many cases. However, especially in the application to a sun proof of an automobile, direct rays of the sun will pass through the glass, the color hue of the glass is rather recognizable even though the visible light transmittance is low. Accordingly, it is important to attain both low visible light transmittance and low excitation purity.

In the glass of the present invention, $Cr_2O_3$ is a component which is capable of reducing the visible light transmittance without increasing the excitation purity so much. If the content of $Cr_2O_3$ is less than 0.002 part by weight, per 100 parts by weight of the matrix component, the excitation purity tends to be high in case the amount of iron is substantial, and the visible light transmittance tends to be high in case where the amount of iron is small. The content of $Cr_2O_3$ is preferably at least 0.0025 part by weight, per 100 parts by weight of the matrix component. On the other hand, if it exceeds 0.05 part by weight, per 100 parts by weight of the matrix, the excitation purity tends to be high due to absorption by $Cr_2O_3$ itself, although the visible light transmittance can be reduced. To obtain visible light transmittance and excitation purity particularly suitable for a rear window glass or sun roof application, the content is preferably at most 0.015 part by weight, more preferably at most 0.01 part by weight, per 100 parts by weight of the matrix component.

The soda lime silicate glass, as the matrix component, preferably comprises following compositions:

| | |
|---|---|
| $SiO_2$ | 65 to 75 wt %, |
| $Al_2O_3$ | 0.1 to 5 wt %, |
| $Na_2O + K_2O$ | 10 to 18 wt %, |
| CaO | 5 to 15 wt %, and |
| MgO | 1 to 6 wt %. |

If the constant $SiO_2$ is less than 65 wt %, the weather resistance tends to be poor, and if it exceeds 75 wt %, the viscosity tends to be high, whereby melting tends to be difficult. If the content of $Al_2O_3$ is less than 0.1 wt %, the water resistance tends to be low, and if it exceeds 5 wt %, the meltability tends to be low.

$Na_2O$ and $K_2O$ are components which promote melting of the batch. If the total amount of the two is less than 10 wt %, such an effect tends to be low, and if it exceeds 18 wt %, the weather resistance tends to be poor.

CaO and MgO are components which promote melting of the batch and which improve the weather resistance. If the content of CaO is less than 5 wt %, such effects tend to be low, and if it exceeds 15 wt %, the glass tends to be devitrified. If the content of MgO is less than 1 wt %, the above effects tend to be low, and if it exceeds 6 wt %, the glass tends to be devitrified.

Further, in practical production, a refining agent such as Glauber's salt is used, and as its residue, $SO_3$ in an amount of from about 0.05 to 1.0 wt %, usually remains in the glass.

When the glass of the present invention is used as a sun roof, rear window glass or rear side window glass of an automobile, it is preferably a glass having the above composition and having the following optical properties.

Firstly, in a thickness of 5 mm, the visible light transmittance $T_{va}$ is preferably at most 20%, more preferably from 2 to 17%. Likewise, in a thickness of 5 mm, the solar radiation transmittance $T_E$ is preferably at most 25%, more preferably from 6 to 20%. Further, in a thickness of 5 mm, the ultraviolet ray transmittance $T_{uv}$ is preferably at most 10%, more preferably from 0.2 to 6%.

In addition to the above optical properties, it is preferred that in a thickness of from 3 to 5 mm, the dominant wavelength $D_w$ is from 490 to 580 nm, and the excitation purity is at most 7%. A glass having an excitation purity of from 1 to 4% is particularly preferred. In a case where the glass of the present invention is used in the form of a laminated glass, the thickness of each of glass sheets to be laminated is usually from about 2 to 2.3 mm, and the thickness of a laminated glass having a pair of such sheets laminated will usually be from 4 to 4.6 mm. So long as such a laminated glass satisfies the optical properties as defined above, it is within the range of the preferred glass of the present invention.

When the glass of the present invention is to be used for a sun roof, rear window glass or rear side window glass of an automobile, the glass is formed into a sheet and used as a glass sheet having a visible light transmittance $T_{va}$ of at most 25%, preferably at most 22%, in the practical thickness of from 2.6 to 6 mm.

Throughout the present specification, the solar radiation transmittance and the visible light transmittance are ones determined in accordance with JIS R3106, and the ultraviolet ray transmittance is one determined in accordance with ISO 9050. The visible light transmittance was measured by using illuminant A, and the dominant wavelength and the excitation purity were measured by using illuminant C.

More preferably, the glass of the present invention comprises coloring components of the following composition, per 100 parts by weight of the matrix component:

| | |
|---|---|
| Total iron calculated as $Fe_2O_3$ | 1.0 to 1.4 parts by weight, |
| FeO | 0.1 to 0.3 part by weight, |
| $TiO_2$ | 0 to 1.0 part by weight, |
| Se | 0.0005 to 0.015 part by weight, |
| CoO | 0.02 to 0.05 part by weight, and |
| $Cr_2O_3$ | 0.002 to 0.05 part by weight. |

Particularly preferably, the glass of the present invention comprises coloring components of the following composition, per 100 parts by weight of the matrix component:

| | |
|---|---|
| Total iron calculated as $Fe_2O_3$ | 1.0 to 1.35 parts by weight, |
| FeO | 0.1 to 0.3 part by weight, |
| $TiO_2$ | 0 to 1.0 part by weight, |
| Se | 0.0005 to 0.015 part by weight, |
| CoO | 0.021 to 0.05 part by weight, and |
| $Cr_2O_3$ | 0.002 to 0.05 part by weight. |

The glass of the present invention can be produced, for example, as follows, although the process for its production is not particularly limited.

Mixed raw materials are continuously supplied to a melting furnace and heated for vitrification at a temperature of about 1500° C. by e.g. heavy oil. Then, this molten glass is refined and then formed into a glass sheet having a predetermined thickness by e.g. a float process. Then, this glass sheet is cut into a predetermined size to obtain the glass of the present invention. If necessary, the cut glass may be subjected to reinforcing treatment or may be processed into a laminated glass or double glazing.

Now, the present invention will be described in further detail with reference to Examples. However, it should be understood that the present invention is by no means restricted to such specific Examples.

EXAMPLES 1 to 12

Using silica sand, feldspar, dolomite, soda ash, Galuber's salt, ferric oxide, titanium oxide, cobalt oxide and selenium oxide, as raw materials, a batch prepared to obtain a glass of the composition as shown in Table 1, 2 or 3, was melted in a conventional melting tank (in an atmosphere having an $O_2$ concentration of about 2%), and the molten glass was supplied to a small size float test plant connected to the melting tank, to obtain a dark gray colored sheet glass.

As the matrix component, a soda lime silicate glass comprising 71.4 wt % of $SiO_2$, 1.8 wt % of $Al_2O_3$, 8.5 wt % of CaO, 4.5 wt % of MgO, 12.8 wt % of $Na_2O$, 0.7 wt % of $K_2O$ and 0.3 wt % of $SO_3$, was used. Table 1 shows the amounts by parts by weight of t-$Fe_2O_3$ (total iron calculated as $Fe_2O_3$), FeO, CoO, Se, $TiO_2$ and $Cr_2O_3$ added as coloring components, per 100 parts by weight of the matrix component.

With respect to each sheet glass, the solar radiation transmittance $T_E$ (%), the visible light transmittance $T_{va}$ (%), the ultraviolet ray transmittance $T_{uv}$ (%), the dominant wavelength $D_w$ (nm) and the excitation purity $P_e$ (%) were obtained, and the results are shown in Tables 1, 2 and 3. Each of these values was calculated in a thickness of 5 mm. Examples 11 and 12 are Comparative Examples which are outside the scope of the present invention. Further, the amount of $TiO_2$ in Examples 9 and 10 is considered to be the minimum amount among various impurity levels.

In the Examples of the present invention, gray colored glasses having low visual light transmittance, remarkably lowered solar radiation transmittance, and ultraviolet ray transmittance and low excitation purity, were obtained.

TABLE 1

| | 1 | 2 | 3 | 4 | 5 |
|---|---|---|---|---|---|
| t-$Fe_2O_3$ | 1.23 | 0.92 | 0.82 | 1.43 | 1.23 |
| FeO | 0.19 | 0.21 | 0.22 | 0.18 | 0.21 |
| CoO | 0.0255 | 0.0210 | 0.0202 | 0.0268 | 0.0255 |
| Se | 0.0036 | 0.0045 | 0.0038 | 0.0035 | 0.0025 |
| $TiO_2$ | 0.08 | 0.06 | 0.095 | 0.05 | 0.9 |
| $Cr_2O_3$ | 0.0087 | 0.0343 | 0.0038 | 0.0028 | 0.0035 |
| REDOX (%) | 17.35 | 25.37 | 29.82 | 13.99 | 18.97 |
| $T_E$ (%) | 14.3 | 11.8 | 17.3 | 7.6 | 9.4 |
| $T_{VS}$ (%) | 10.0 | 7.4 | 15.3 | 1.1 | 5.5 |
| $T_{UV}$ (%) | 0.1 | 7.2 | 6.5 | 3.1 | 2.6 |
| $D_W$ (nm) | 547.3 | 517.5 | 492.4 | 567.9 | 569.3 |
| $P_e$ (%) | 2.7 | 3.0 | 0.3 | 2.5 | 6.7 |

TABLE 2

| | 6 | 7 | 8 | 9 | 10 |
|---|---|---|---|---|---|
| t-$Fe_2O_3$ | 1.23 | 0.92 | 0.82 | 1.43 | 1.23 |
| FeO | 0.28 | 0.15 | 0.21 | 0.23 | 0.28 |
| CoO | 0.0210 | 0.0362 | 0.0220 | 0.0215 | 0.0239 |
| Se | 0.0030 | 0.0068 | 0.0015 | 0.0025 | 0.0024 |
| $TiO_2$ | 0.06 | 0.06 | 0.85 | 0.015 | 0.015 |
| $Cr_2O_3$ | 0.0120 | 0.0086 | 0.0045 | 0.0028 | 0.0023 |
| REDOX (%) | 23.94 | 19.16 | 22.88 | 21.05 | 24.95 |
| $T_E$ (%) | 6.8 | 7.7 | 17.2 | 13.0 | 9.9 |
| $T_{VS}$ (%) | 8.7 | 16.6 | 16.4 | 12.2 | 9.8 |
| $T_{UV}$ (%) | 3.1 | 0.6 | 1.3 | 1.1 | 1.1 |
| $D_W$ (nm) | 525.1 | 539.7 | 517.1 | 566.8 | 532.0 |
| $P_e$ (%) | 2.3 | 5.3 | 1.3 | 3.9 | 1.0 |

TABLE 3

| | 11 | 12 |
|---|---|---|
| t-$Fe_2O_3$ | 0.44 | 1.20 |
| FeO | 0.12 | 0.09 |
| CoO | 0.0150 | 0.0510 |
| Se | 0.0015 | 0.0160 |
| $TiO_2$ | 0 | 0.6 |
| $Cr_2O_3$ | 0.0001 | 0.0051 |
| REDOX (%) | 30.31 | 8.33 |
| $T_E$ (%) | 38.0 | 4.7 |
| $T_{VS}$ (%) | 38.3 | 0.3 |
| $T_{UV}$ (%) | 11.0 | 0.9 |
| $D_W$ (nm) | 477.3 | 578.9 |
| $P_e$ (%) | 11.3 | 40.3 |

As described in the foregoing, the dark gray colored glass of the present invention has low visible light transmittance with the solar radiation transmittance and ultraviolet ray transmittance substantially reduced and has a low excitation purity. Further, it is excellent in the meltability, and it can readily be melted by a conventional melting furnace and can be prepared by a float process which is excellent in the productivity.

What is claimed is:

[1. A dark gray colored glass comprising 100 parts by weight of a soda lime silicate glass as a matrix component and coloring components consisting essentially of from 0.8 to 1 parts by weight of total iron calculated as $Fe_2O_3$, from 0.1 to 0.3 part by weight of FeO, from 0 to 1.0 part by weight of $TiO_2$, from 0.0005 to 0.15 part by weight of Se, from 0.021 to 0.05 part by weight of CoO and from 0.002 to 0.05 part by weight of $Cr_2O_3$ wherein the glass with a thickness of from 3 to 5 mm has an excitation purity of at most 7%, as measured by using illuminant C and wherein the glass with a thickness of 5 mm has a visible light transmittance of at most 20% and a solar radiation transmittance of at most 20% as measured using illuminant A.]

[2. The dark gray colored glass according to claim 1, wherein a proportion of ferrous iron calculated as $Fe_2O_3$ in the total iron calculated as $Fe_2O_3$ is from 10 to 30%.]

[3. The dark gray colored glass according to claim 1, wherein the glass with a thickness of 5 mm has an ultraviolet ray transmittance of at most 10%.]

[4. The dark gray colored glass according to claim 1, wherein the glass with a thickness of from 3 to 5 mm has a dominant wavelength of from 490 to 580 nm, as measured by using illuminant C.]

[5. The dary gray colored glass according to claim 1, wherein the soda lime silicate glass comprises from 65 to 75 wt % of $SiO_2$, from 0.1 to 5 wt % of $Al_2O_3$, from 10 to 18 wt % of $Na_2O+K_2O$, from 5 to 15 wt % of CaO and from 1 to 6 wt % of MgO.]

[6. A glass sheet which is made of the dark gray colored glass according to claim 1, and which has a thickness of from 2.6 to 6 mm.]

[7. The dark gray colored glass according to claim 1, wherein the amount of $Cr_2O_3$ is from 0.002 to 0.015 part by weight.]

[8. The dark gray colored glass according to claim 1, wherein said glass does not contain NiO.]

[9. The dark gray colored glass according to claim 1, wherein said glass does not contain NiS.]

*10. A dark gray colored glass comprising 100 parts by weight of a soda lime silicate glass as a matrix component and coloring components consisting essentially of from 1.0 to 1.35 parts by weight of total iron calculated as $Fe_2O_3$, from 0.1 to 0.3 part by weight of FeO, from 0 to 1.0 part by weight of $TiO_2$, from 0.0005 to 0.015 part by weight of Se, from 0.021 to 0.05 part by weight of CoO and from 0.002 to 0.05 part by weight of $Cr_2O_3$ wherein the glass with a thickness of from 3 to 5 mm has an excitation purity of at most 7%, as measured by using illuminant C*

*and wherein the glass with a thickness of 5 mm has a visible light transmittance of at most 20% as measured using illuminant A, and a solar radiation transmittance of at most 20%.*

*11. The dark gray colored glass according to claim 10, wherein a proportion of ferrous iron calculated as $Fe_2O_3$ in the total iron calculated as $Fe_2O_3$ is from 10 to 30%.*

*12. The dark gray colored glass according to claim 10, wherein the glass with a thickness of 5 mm has an ultraviolet ray transmittance of at most 10%.*

*13. The dark gray colored glass according to claim 10, wherein the glass with a thickness of from 3 to 5 mm has a dominant wavelength of from 490 to 580 nm, as measured by using illuminant C.*

*14. The dark gray colored glass according to claim 10, wherein the soda lime silicate glass comprises from 65 to 75 wt % of $SiO_2$, from 0.1 to 5 wt % of $Al_2O_3$, from 10 to 18 wt % of $Na_2O+K_2O$, from 5 to 15 wt % of CaO and from 1 to 6 wt % of MgO.*

*15. A glass sheet which is made of the dark gray colored glass according to claim 10, and which has a thickness of from 2.6 to 6 mm.*

*16. The dark gray colored glass according to claim 10, wherein the amount of $Cr_2O_3$ is from 0.002 to 0.015 part by weight.*

*17. The dark gray colored glass according to claim 10, wherein said glass does not contain NiO.*

*18. The dark gray colored glass according to claim 10, wherein said glass does not contain NiS.*

* * * * *